United States Patent Office 3,733,273
Patented May 15, 1973

3,733,273
AZEOTROPIC COMPOSITION OF FLUOROCARBONS
Bradley L. Munro, Bartlesville, Okla., assignor to Phillips Petroleum Company, Bartlesville, Okla.
No Drawing. Filed Jan. 3, 1972, Ser. No. 215,087
Int. Cl. C09k 3/06
U.S. Cl. 252—1                                      5 Claims

ABSTRACT OF THE DISCLOSURE

An azeotropic composition is formed by 1,2-dichloro-1,1,2,2-tetrafluoroethane and 1-chloro-1,2,2-trifluoroethane.

FIELD OF THE INVENTION

This invention relates to novel compositions of chlorofluorocarbons.

BACKGROUND OF THE INVENTION

Azeotropic mixtures are liquid mixtures of two or more substances which mixtures behave like a single substance in that the vapor produced by partial evaporation or distillation of the azeotropic liquid has the same composition as does the liquid. Azeotropic compositions exhibit either a maximum or minimum boiling point as compared with that of other but non-azeotropic mixtures of the same two or more substances.

OBJECTS OF THE INVENTION

It is an object of this invention to provide novel substantially constant-boiling compositions. It is another object to provide novel azeotropic compositions.

Other aspects, objects, and the several advantages of my invention will be readily apparent to one skilled in the art to which the invention most nearly pertains from the reading of my description and the consideration of my appended claims.

SUMMARY OF THE INVENTION

I have discovered that 1,2-dichloro-1,1,2,2-tetrafluoroethane and 1-chloro-1,2,2-trifluoroethane together form substantially constant-boiling admixtures, and indeed at least one azeotrope. An azeotrope may be defined as a constant-boiling mixture which distills without changing composition. Yet, at a differing pressure, the composition indeed may vary, at least slightly, with change in distillation pressure, which also changes, at least slightly, the distillation temperature. Thus, an azeotrope of A and B may represent a unique type of relationship with a variable composition.

It should be possible to fingerprint a constant-boiling admixture which may appear under varying guises depending upon the conditions chosen, by any of several criteria: The composition may be defined as an azeotrope of A and B, since the very term "azeotrope" is at once definitive and limitative, requiring that A and B indeed form this unique composition of matter which is a constant-boiling admixture. Or, the composition may be defined as a particular weight percent relationship or mole percent relationship of A:B, but recognizing that such values point out only one such relationship, while a series of relationships A:B actually may exist for an azeotrope, varied by influence of temperature and pressure. Or, recognizing that broadly speaking in an azeotrope of A:B represents a series of relationships, the azeotropic series of A:B may in effect be fingerprinted or characterized by defining the composition as an azeotrope further characterized by particular boiling point at a given pressure, thus giving identifying characteristics without unduly limiting the scope of the invention.

The substantially constant-boiling admixture I have discovered is between a major amount of 1,2-dichloro-1,1,2,2-tetrafluoroethane and a minor amount of 1-chloro-1,2,2-trifluoroethane. One substantially constant-boiling admixture of these chlorofluorohydrocarbons is characterized by a boiling point of about 175° F. at a pressure of about 137.5 p.s.i.a. Another substantially constant-boiling admixture is characterized by a boiling point of about 112–115° F., more closely about 113–113.5° F., at a pressure of about 64.7 p.s.i.a. From chromatographic analyses made of the admixtures, it would appear probable that differing azeotropes are involved.

EXAMPLES

The following data are presented to illustrate my invention and to show the determination of the constant-boiling admixtures I have discovered.

EXAMPLE I

A mixture of 1,2-dichloro-1,1,2,2-tetrafluoroethane (114) and 1-chloro-1,2,2-trifluoroethane (133) was subjected to distillation. Cuts of the distillate were taken and analyzed by chromatographic methods in order to determine the composition of the overhead cuts. It is recognized that a specific temperature:pressure relationship governs the particular composition at a given time.

Distillation of the admixture in a 2-inch packed column at about 50 p.s.i.g. (64.7 p.s.i.a.) pressure produced constant-boiling cuts of the following compositions:

TABLE I

| Component | Percentage composition [a] at indicated distillation temperature | | | |
|---|---|---|---|---|
| | 112–113° F. | 113° F. | 113–113.5° F. | 113.5–115° F. |
| 114 [b] | 87.31 | 84.95 | 84.14 | 87.35 |
| 133 [c] | 12.19 | 14.66 | 15.20 | 11.87 |

[a] Chromatographic analysis.
[b] 114=1,2-dichloro-1,1,2,2-tetrafluoroethane.
[c] 133=1-chloro-1,2,2-trifluoroethane.

Differences between the total of combining 114 plus 133 and 100 percent reflects minor traces of other materials present in the mixture, or undetermined on analysis. As can be observed, the substantially constant-boiling admixture at 50 p.s.i.g. ranges from about 11.8 to about 15.2 weight percent of 133, the balance 114. Thus, compositions in such a range are considered to be included in my discovery, although the azeotrope appears to be more nearly 85:15 weight percent ratio 114:133 at the specified temperature and pressure.

EXAMPLE II

A further composition of the two chlorofluorohydrocarbons was subjected to distillation, with the distillation pressure at about 137.5 p.s.i.a. A substantially constant-boiling admixture was obtained distilling at about 175° F.

Analysis of this substantially constant-boiling admixture by chromatographic analytical methods determined a mole ratio of 114:133 of about 0.82:0.18, or on a weight ratio basis of about 0.868:0.132.

Compositions of my invention are useful as aerosol propellants; as blowing agents in the manufacture of foam-molded plastics; as liquid dielectric, since these fluorocarbons are essentially non-conductors; as hydraulic fluids in many applications, since these liquid compositions are essentially noncompressible and nonflammable; as fire extinguishing agents, since such admixtures are volatile and have a high adsorbency for heat, exerting both a cooling as well as a smothering activity; as cleaning solvent-fluids for many applications, since these materials have a high solvency for many dirts and oils and other soils on garments, low toxicity and nonflammability; and as refrigerants.

For use as refrigerants, it is preferable to employ as close to the azeotropic compositions as possible, since such applications generally require a gaseous phase as closely similar to the liquid phase as possible.

From the preceding descriptions, it will be apparent that my invention provides novel substantially constant-boiling and azeotropic compositions useful for a wide variety of purposes.

Embodiments of the invention in which an exclusive property or privilege is claimed are defined by the claims herein attached.

I claim:

1. A substantially constant boiling admixture of at least about 80% by weight of 1,2-dichloro-1,1,2,2-tetrafluoroethane and not more than about 20% by weight of 1-chloro-1,2,2-trifluoroethane, said admixture characterized as an azeotrope.

2. The admixture according to claim 1 characterized by a boiling point of about 175° F. at a pressure of about 137.5 p.s.i.a.

3. The admixture according to claim 1 further characterized by a mole ratio of about 0.82:0.18.

4. The admixture according to claim 1 further characterized by a boiling point of about 112–115° F. at a pressure of about 64.7 p.s.i.a.

5. The admixture according to claim 1 further characterized by a percentage composition of about 11.8 to 15.2 weight percent said 1-chloro-1,2,2,-trifluoroethane and the remainder said 1,2-dichloro-1,1,2,2-tetrafluoroethane.

References Cited

UNITED STATES PATENTS 3,607,755   9/1971   Murphy et al. -------- 252—67
2,191,196   2/1940   Fleischer ------------ 62—178

GEORGE F. LESMES, Primary Examiner

W. R. DIXON, Jr., Assistant Examiner

U.S. Cl. X.R.

203—67; 252—8, 65, 67, 172